United States Patent [19]

Freudenschuss et al.

[11] 4,066,345
[45] Jan. 3, 1978

[54] SOUND-FILM CAMERA

[75] Inventors: Otto Freudenschuss; Otto Kantner; Peter Revy von Belvard, all of Vienna, Austria

[73] Assignees: Karl Vockenhuber; Raimund Hauser, both of Vienna, Austria

[21] Appl. No.: 669,110

[22] Filed: Mar. 22, 1976

Related U.S. Application Data

[63] Continuation-in-part of Ser. No. 460,136, April 11, 1974, abandoned.

[30] Foreign Application Priority Data

May 24, 1973 Austria ................................ 4565/73
June 14, 1973 Austria ................................ 5263/73

[51] Int. Cl.² ........................................... G03B 31/02
[52] U.S. Cl. ....................................... 352/27; 352/72; 352/178
[58] Field of Search ...................... 352/27, 29, 30, 72, 352/174, 176, 178

[56] References Cited

U.S. PATENT DOCUMENTS

| T920,009 | 3/1974 | Kosarko | 352/72 |
| 3,825,327 | 7/1974 | Kosarko | 352/72 |
| 3,880,504 | 4/1975 | Marvin | 352/72 |

Primary Examiner—Monroe H. Hayes
Attorney, Agent, or Firm—Montague & Ross

[57] ABSTRACT

A cine camera for taking talking pictures comprises a film-feeding mechanism which includes a driven capstan and a pinch roller normally spaced therefrom to facilitate insertion of a section of film therebetween when the camera casing is loaded with a sound-film cassette. A trigger, serving to close a switch for energizing the film drive, becomes effective to move the pinch roller — mechanically or electromagnetically — into a working position close to the capstan after a support for this roller has been moved from a retracted position into a standby position by the displacement of an independently operable external actuating member. Continued depression of the trigger may prevent the roller support from returning to its retracted position even if the actuating member is released.

13 Claims, 10 Drawing Figures

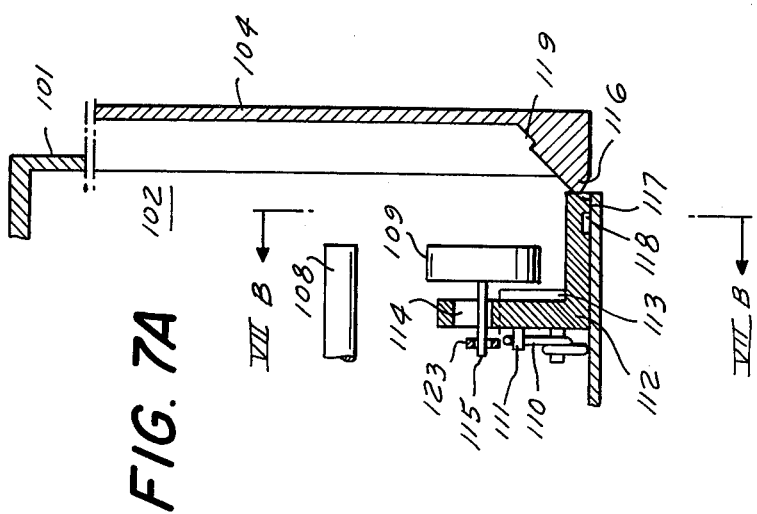
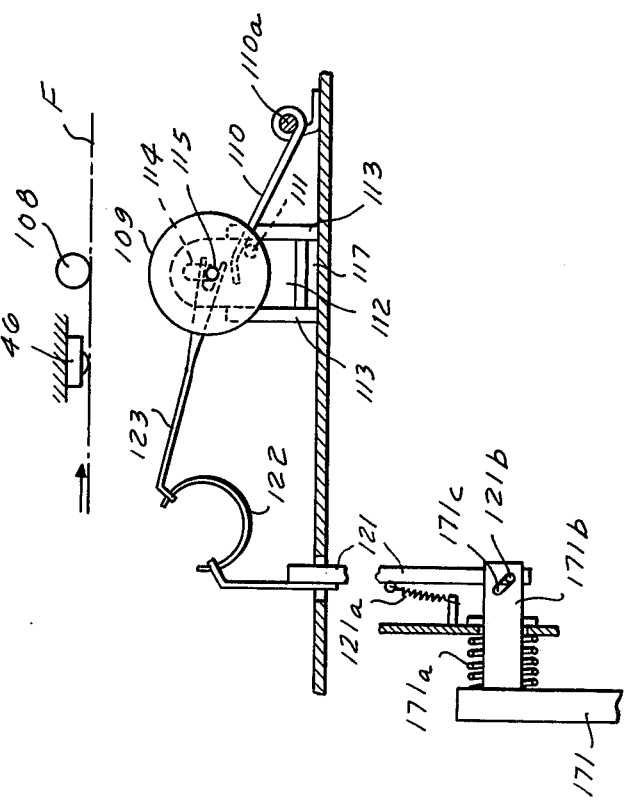

SOUND-FILM CAMERA

CROSS-REFERENCE TO RELATED APPLICATION

This is a continuation-in-part of our copending application Ser. No. 460,136 filed Apr. 11, 1974, and now abandoned.

FIELD OF THE INVENTION

Our present invention relates to a cine camera adapted to accommodate a motion-picture film having a sound track, the camera being provided with an exposure or image gate and sound-recording means.

BACKGROUND OF THE INVENTION

In such a cine camera the film must be transported intermittently, by the usual reciprocating-claw mechanism, past the exposure gate and at substantially constant speed past the recording head. An advantageous constant-speed feeder comprises a driven capstan and a pinch roller serving to clamp the film between itself and the capstan. Means for co-ordinating the two drives have been described in our prior application referred to above and in our copending application Ser. No. 669085 filed Mar. 23, 1976 as a continuation-in-part thereof, now U.S. Pat. No. 4,003,643.

As further disclosed in that prior application and in the aforementioned continuation-in-part thereof, as well as in our copending application Ser. No. 669,338 filed Mar. 22, 1976 as another continuation-in-part of that prior application, the pinch roller and the capstan should be widely separated during the loading of the camera with a sound-film cassette in order to provide the necessary clearance for the insertion of an unsupported stretch of film therebetween; upon such insertion, and prior to the operation of a release button or trigger to start the film drive, a feeler discriminating between silent-film and sound-film cassettes causes the pinch roller to move closer to the capstan in the presence of a cassette of the sound-film type to engage the film.

OBJECT OF THE INVENTION

The object of our present invention is to provide alternate means for controlling the movement of the pinch roller toward the capstan preparatorily to operation of the trigger, e.g., in the case of a camera designed only for sound-film operation.

SUMMARY OF THE INVENTION

We realize this object, in accordance with our present invention, by the provision of an external actuating member on the camera casing coupled with a support for the pinch roller and manually operable, independently of the trigger, for moving that roller out of a retracted position remote from the capstan into an alternate position proximal to the capstan preparatorily to operation of the trigger.

It should be understood, however, that the capstan could also be moved toward and away from the pinch roller, such as kinematic inversion (as well as the possibility of displacing both the capstan and the pinch roller) coming therefore within the scope of our invention.

Such an external actuating member may take a variety of shapes. Thus, it may be a bar manipulable by the fingers of a user holding the camera casing, the bar lying preferably on a lower camera surface or on a handle or grip secured to the casing. Alternatively, a projection on a rear face of the casing may be engageable by the head of the user holding the camera body in his hand, it being therefore understood that the term "manually operable" is not confined to a member displaceable directly by hand. Another solution, especially though not exclusively for a camera designed only for use with sound-film cassettes, utilizes a lid or door of a cassette-receiving chamber as the actuating member which displaces the pinch-roller support into its alternate position upon closure.

The alternate position referred to may be a working position in which the pinch roller is close enough to the capstan to clamp the film therebetween, advantageously under pressure of a biasing spring. We may, however, let the actuating member displace the support only into a standby position which still leaves a small clearance between the capstan and the roller so that the film is not driven, that clearance being eliminated upon operation of the trigger by a further displacement of the roller support from its intermediate or standby position into a working position or of the pinch roller alone with reference to the support on which it is limitedly movable. The coupling between the trigger and the pinch roller or its support may be either mechanical or electromagnetic; a mechanical linkage of this nature may block the operation of the trigger as long as the actuating member has not been displaced to preset the constant-speed film drive.

BRIEF DESCRIPTION OF THE DRAWING

The above and other features of our invention will now be described in detail with reference to the accompanying drawing in which:

FIG. 7A is a fragmentary cross-sectional view of another camera embodying our invention; and FIG. 7B is a fragmentary sectional view taken on the line VIIB — VIIB of FIG. 7A.

Specific Description

Figure 1:
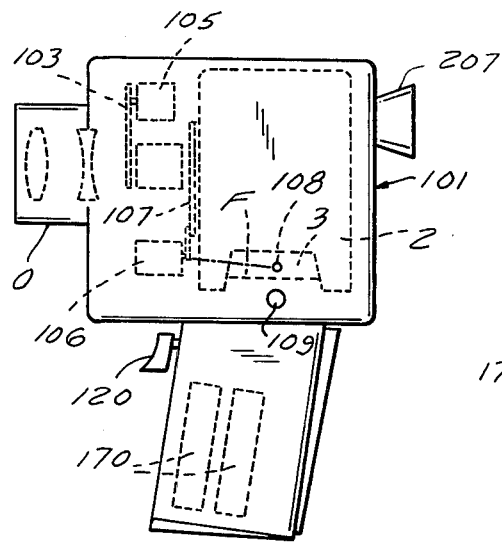
FIG. 1 is a side-elevational view of a cine camera embodying our invention.

In FIG. 1 we have shown a motion-picture camera 101 loaded with a sound-film cassette 2, the camera being equipped with an objective O aligned with an exposure gate and with an eyepiece 207 forming part of a viewfinder. The exposure gate includes an iris diaphragm 103 under the control of a photometer 105, commonly referred to as an electric eye, which varies its effective cross-section in accordance with ambient lighting conditions. A motor 106, energizable by a power pack shown as a set of batteries 170 in a handgrip 82 attached to the camera casing, drives on the one hand a transport claw 107 and on the other hand a capstan 108. Upon the depression of a release button or trigger 120 on handgrip 82, an energizing circuit for motor 106 is closed via a switch 172 (FIG. 3) whereupon a film F, provided with a sound track, is intermittently advanced by the reciprocating traction claw 107 past the exposure gate and is simultaneously engaged, at a location downstream of that gate, by the continuously rotating capstan 108 and a coacting pinch roller 109 for movement at substantially constant speed across a sound-recording head 46 shown in FIG. 7B. The capstan 108, the pinch roller 109 and the recording head 46 are disposed within a recess 3 of the cassette body defined by a pair of legs between which the film F travels in an otherwise unsupported manner.

Figure 2A:
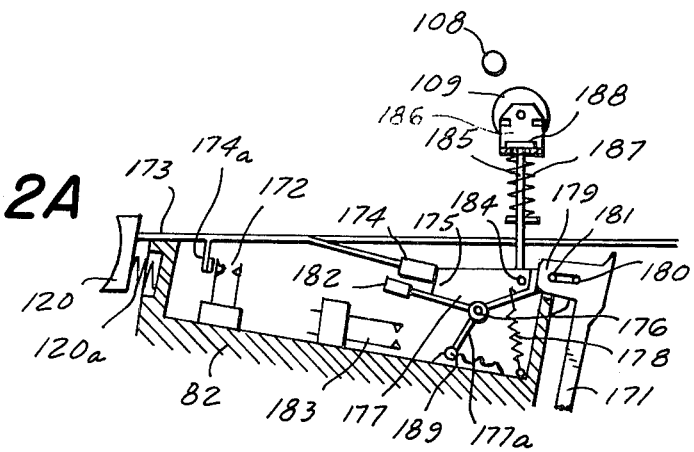
FIGS. 2A, 2B and 2C are somewhat diagrammatic views of a mechanism for controlling a pinch roller in accordance with our invention, shown in three distinct positions.
Figure 2B:
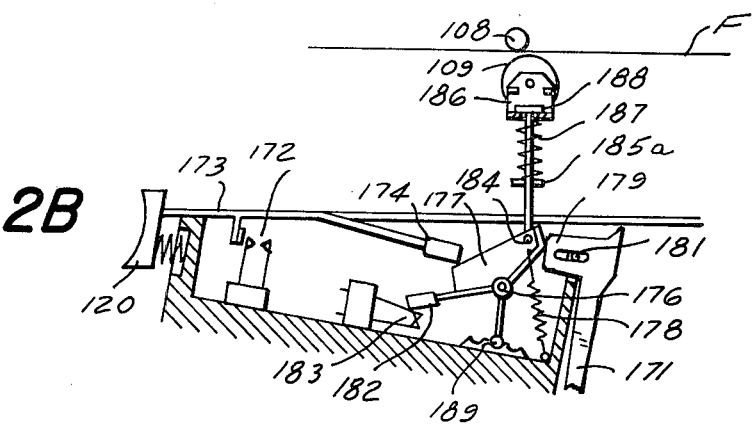
Figure 2C:
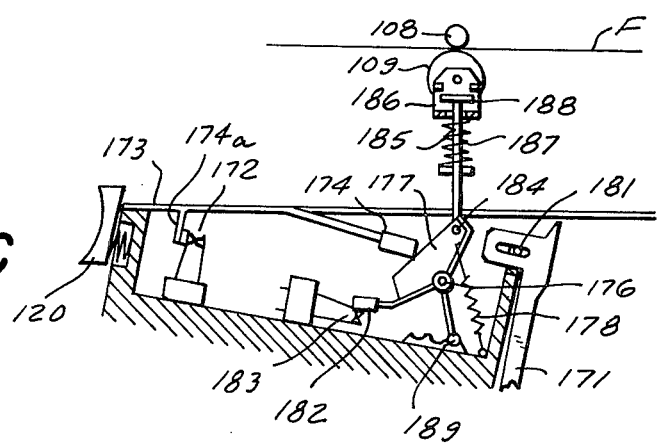

The handgrip 82 is provided, on its side opposite the trigger 120, with a separate actuating member 171 in the form of a bar pivotally mounted thereon for independent inward displacement by the fingers of a user holding the camera 101. As shown in FIGS. 2A-2C, the upper part of a bar 171 has an extension 179 provided with a slot 180 which is traversed by a pin 181 fixedly positioned in handgrip 82. Extension 179 bears upon a cam 177 which is swingable about a shaft 176 journaled in the handgrip, the cam forming part of a support for the pinch roller 109 which also includes a stem 187 articulated to the cam at 184. Stem 185 terminates in a head 188 and has a shoulder 185a, a spring 185 bearing upon this shoulder and upon a bracket 186 on which the roller 109 is journaled. Head 188 limits the extent to which the roller 109 may be thrust outwardly by the spring 187 on stem 185. Aside from stem 185 and the elements supported thereon, the mechanism shown in FIGS. 2A - 2C is similar to one disclosed in commonly owned U.S. Pat. No. 3,582,200.

A tension spring 178 is anchored to handgrip 82 and to cam 177 for tending to swing the latter about its shaft 176 in a clockwise sense as viewed in FIGS. 2A-2C, this swing being limited in the normal position of FIG. 2A by the pins 181 as the cam 177 comes to rest against the bar extension 179. In this normal or insertion position, in which the pinch roller 109 is widely separated from capstan 108 to facilitate the insertion of a film F (FIG. 1), a face 175 of cam 177 is engaged by a prong 174 branching at an acute angle off a rod 173 which carries the trigger or release button 120. This trigger is normally held in an extended position, shown in FIGS. 2A and 2B, by an associated biasing spring 120a. A spur 174a of rod 173 coacts with the switch 172 which remains open as long as the trigger 120 is in this normal position.

Figure 3:
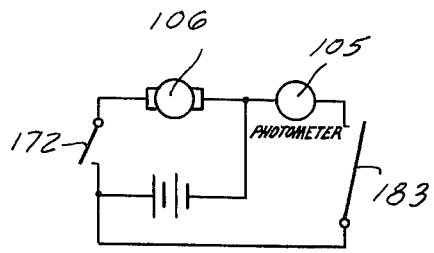
FIG. 3 is a part of a circuit diagram for the power supply of a camera incorporating the mechanism of FIGS. 2A – 2C.

A further switch 183, also shown in FIG. 3, lies in the energizing circuit of photometer 105 and can be closed by a spur 182 of cam 177 when the latter is swung counterclockwise from its normal position into an intermediate or standby position illustrated in FIG. 2B. A further spur 177a of cam 177 terminates in an indexing roller energizing in notches of a rack 189 for the purpose of releasably arresting the cam 177 in any of the three positions illustrated in FIGS. 2A, 2B and 2C.

In the position of FIG. 2A the trigger 120 cannot be depressed since the prong 174 is stopped by the face 175 of cam 177. In order to release the trigger, the user must squeeze the actuating member 171 inwardly (to the left of FIG. 2A) whereby cam 177 is rotated about its fulcrum 176 against the force of its biasing spring 178 and elevates the pinch roller 109 into a position close to the capstan 108. This motion causes the prong 174 to slide off the face 175 of cam 177 whereupon the trigger 120 can be operated as illustrated in FIG. 2C, thereby continuing the counterclockwise swing of cam 177 into its third position in which the film F is clamped between the capstan 108 and the pinch roller 109 under pressure from spring 187. The photometer 183 is closed by the spur 182 already in the intermediate position of FIG. 2B; the start switch 172 is closed by spur 174a only in the final position of FIG. 2C and, upon such closure, energizes the drive motor 106 while releasing a mechanical detent which normally stops the film feed in a position in which a nonillustrated shutter obstructs the exposure gate.

As long as the trigger 120 is held depressed, prong 174 maintains the cam 177 in the working position of FIG. 2C separated from actuating member 171. That member, therefore, can be released immediately after the trigger has been operated.

If desired, the operation of the capstan drive may be started earlier, e.g., in the position of FIG. 2B under the control of switch 183, provided the feed mechanism includes an electromagnetic clutch or the like designed to decouple the claw drive from the motor 106 until the trigger 120 is pressed. Master switch 183 may then lie in FIG. 3 between the battery 170 and the junction of the two circuit branches containing the motor 106 and the instrument 105.

The lost-motion connection between stem 185 and bracket 186, provided by the head 188, insures that the clamping pressure acting upon the film F is determined only by the spring 187 and not by the force manually exerted upon trigger 120.

Figure 4:
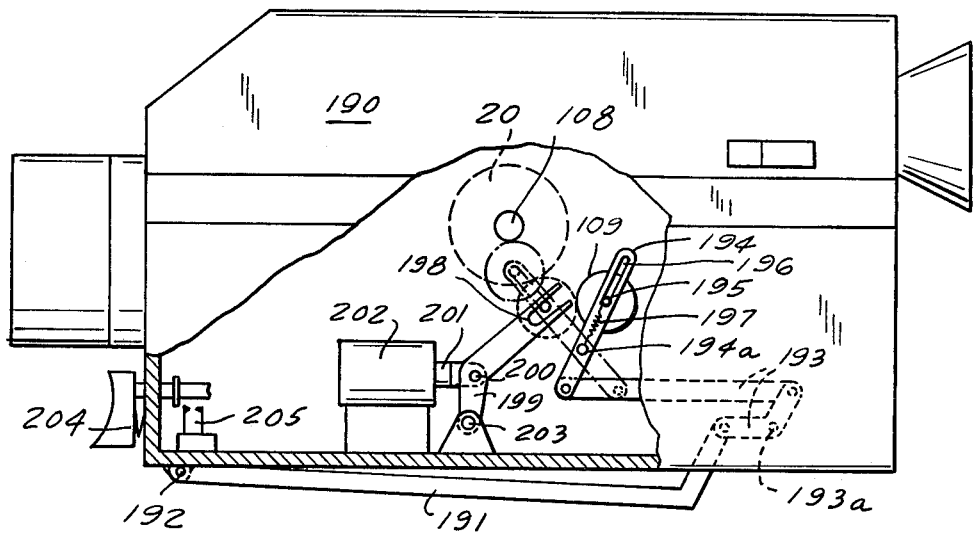
FIG. 4 is a side-elevational view, partly broken away, of a camera according to our invention comprising a modified positioning mechanism for a pinch roller.

In FIG. 4 we have shown a modified camera 190 with a trigger 204 mounted directly on the camera casing, the actuating member being here represented by a bar 191 hinged to that casing at 192 in the vicinity of the trigger. A start switch 205, controlled by trigger 204, is again closable by depression of the trigger against the force of an associated spring; in this instance the trigger is not blocked in the unoperated position of bar 191 so that the film drive can be started without preliminary manipulation of that bar if, for example, the camera is loaded with a silent-film cassette which does not have a stretch of film inserted between capstan 108 and pinch roller 109. The capstan is here driven by a motor 20 which may be different from the motor driving the nonillustrated transport claw in the region of objective O.

The free end of actuating bar 191 is articulated to a linkage 193 having a fixed fulcrum 193a, that last member 194 of that linkage being swingable about a fixed rod 194a between a normal position shown in full lines and an alternate position shown in dot-dash lines. Link 194 is a yoke between whose arms the pinch roller 109 is cradled, roller shift 195 being received in slots 196 of these arms and being under tension from respective springs 197 (only one shown) anchored to rod 194a. In this retracted position the extremities of shaft 195 are receivable, upon a counterclockwise swing of yoke 194, in bifurcated ends 198 of the arms of another yoke 199 which has a fixed fulcrum at 203 and is articulated at 200 to a core 201 of a solenoid 202 controlled by switch 205.

Thus, a lifting of actuating bar 191 from its illustrated position causes the first link members of link cage 193 to swing clockwise about its fulcrum 193a, with resulting counterclockwise rotation of yoke 194 to deposit the extremities of roller shaft 195 in the bifurcated ends of yoke 199 if the latter is in its normal position, i.e., if the solenoid 202 has not yet been energized by prior operation of trigger 204. If that trigger is not depressed, yoke 199 swings counterclockwise about its fulcrum 203 and elevates the pinch roller 109 into film-clamping position against the force of springs 197, this movement being facilitated by the lost-motion coupling provided by the slots 196. The clamping pressure is here determined by the magnetic force of the solenoid and is again independent of the manual force exerted upon the trigger 204.

Though the solenoid is also energized when the trigger 204 is pressed without prior displacement of bar 191, such energization will only cause an idle swing of the yoke 199 without removing the pinch roller 109 from its retracted position. ON the other hand, once the working position of the pinch roller (shown in phantom lines) has been reached, the tension of springs 197 is incapable of withdrawing the pinch rollers from capstan 108 until the solenoid 202 is deactivated whereupon the weight of bar 191 re-establishes the normal position of yoke 194.

Figure 5:
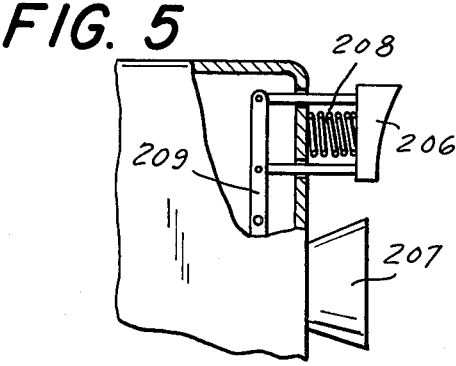
FIGS. 5 and 6 are fragmentary side views of a similar camera, with parts broken away, showing further modifications.

In FIG. 5 we have shown an actuating member comprising a bar 209 secured to a headpiece 206 which is biased outwardly by a spring 208 and lies above the eyepiece 207. The user, looking into the viewfinder, bears with his forehead upon the headpiece 206 and thereby displaces the bar 209 which can be linked with the cam 177 of FIGS. 2A-2C or with the yoke 194 of FIG. 4 in the manner described for bars 171 and 191, respectively.

Figure 6:
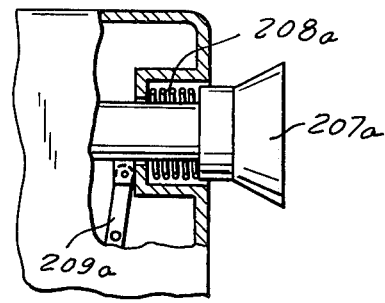

In an analogous manner, a bar 209a shown in FIG. 6 is displaceable by the brow of the user via a movable eyepiece 207a replacing the headpiece 206, this eyepiece being urged outwardly by a spring 208a acting upon its mounting.

The presetting of a pinch roller or its support to a standby position, as described hereinabove, can also be carried out with the acid of an automatic release timer which displaces the cam 177 or the yoke 174 when set, thereafter tripping the trigger 120 or 204.

In FIGS. 7A and 7B we have shown part of a camera casing 101 forming a cassette-receiving chamber 102 which accommodates, in the general manner illustrated in FIG. 1, the capstan 108 and the associated pinch roller 109 in the vicinity of a soundrecording head 46 overlying a film strip F of an inserted cassette (not shown in these Figures). The casing 101 is provided with a lid or door 104 which is hinged to it in the usual manner so as to facilitate loading and unloading.

A hairpin spring 110, coiled about a fixed stud 110a near the bottom of casing 101, bears from above upon a pin 111 on an elbow 112 which is vertically slidable between two guide posts 113 rising from that bottom. Slide 112 has a slot 114 traversed by the shaft 115 of pinch roller 109 which is vertically displaceable within that slot and is maintained in a horizontal position by further guide means not shown. The end of shaft 115 remote from roller 109 is bracketed by a bifurcate extremity of a rod or clevis 123 whose opposite extremity is connected via an arcuate spring 122 with a bar 121 extending outwardly into the handgrip 82 (FIG. 1) of the camera. Actuating member 171, working against a biasing spring 171a, carries a stud 171b provided with a slot 171c receiving a pin 121b of bar 121 which is biased downwardly by a spring 121a. Thus, the exertion of finger pressure on member 171 by the user holding the handgrip raises the bar 121 against the force of spring 121a, yet this has no effect upon the position of pinch roller 109 whose shaft 115 is held down onto the lower end of slot 114 by the clevis 123 under the toggle action of spring 122.

In the illustrated inoperative or insertion position of slider 112, therefore, the film F cannot be clamped between the roller and the capstan 108; thus, even with the capstan set in rotation by closure of the trigger-controlled switch 172 (FIGS. 2A - 2C and 3) the film is not driven. This is the case when the door 104 is open, the door being provided along its lower edge with a camming ledge 116 co-operating with a beveled edge 117 of slider 112 to elevate that slider when the door is closed. Beveled edge 117 forms part of a catch 118 which yieldably engages in a recess 119 of ledge 116 to hold the door in its closed position, under the restraining action of spring 110.

The raising of slider 112 by the door ledge 116 into its operative position elevates the right-hand end (FIG. 7B) of toggle spring 122 sufficiently to let it snap past dead center into an alternate position in which it raises the shaft 115, by a distance less than the length of slot 114, into a standby position. Now the squeezing of actuating member 171 against handgrip 82 (FIG. 1) is effective to eliminate the clearance still existing between the roller 109 and the capstan 108 so that the film will be driven; in this working position the shaft 115 still stays clear of the upper end of slot 114.

When the user releases the bar 171 and reopens the door 104, spring 110 returns the slider 112 to its illustrated position whereby shaft 115 is depressed by the upper end of slot 114, causing toggle spring 122 to snap back to its original state. This re-establishes the insertion position in which a wide gap separates the capstan 108 from the pinch roller 109.

The system shown in FIGS. 7A and 7B could be modified by replacing the actuating member 171 with the trigger 120 of FIG. 1, as shown in our prior application Ser. No. 460,136. The door or lid 104 with its projecting formation 116 plays in either of these cases the role of an external actuating member on an outer surface of casing 101. Alternatively, as likewise shown in that prior application and also in our application Ser. No. 669,338 of even date, the lid may be provided with a projection designed to move a spring-loaded stop out of the path of an actuating knob which can then be pressed to elevate the slider for the purpose of establishing the standby position; this disclosure of our concurrently filed application is incorporarted by reference into the present one.

Finally, if the capstan 108 is placed closer to the starting position of the pinch roller 109, the actuating member 171 (FIGS. 2A - 2C) or 104 can be operated to move the pinch roller directly into a film-clamping position, with elimination of a standby position such as the one shown in FIG. 2B; the film will then be driven as soon as the capstan is set in motion by operation of the trigger.

We claim:

1. In a cine camera, in combination:
   a casing adapted to accommodate a motion-picture film having a sound track, said casing being provided with an exposure gate and sound-recording means;
   drive means in said casing for transporting said film past said exposure gate and said sound-recording means, said drive means including a continuously rotatable capstan and a pinch roller adapted to clamp said film therebetween;

energizing means for said drive means including manually operable trigger means;
support means for displacing said pinch roller relatively to said capstan, said support means including a movable element connected with said pinch roller by a lost-motion coupling;
an external actuating member on an outer surface of said casing coupled with said support means and manually operable independently of said trigger means for relatively displacing said pinch roller and said capstan from a more widely separated normal position into a relatively closely spaced alternate position preparatorily to operation of said trigger means; and
spring means anchored to said element and to said pinch roller, said trigger means being provided with an extension engageable with said element in said alternate position of said support means for moving said pinch roller into an off-normal position closer to said capstan whereby said film is clamped between said pinch roller and said capstan under pressure of said spring means.

2. The combination defined in claim 1, further comprising retaining means engageable with said support means under the control of said trigger means for preventing a return of said pinch roller and said capstan to said normal position in an off-normal position of said trigger means.

3. The combination defined in claim 1 wherein said extension abuts said element in said retracted position thereof for preventing operation of said trigger means.

4. The combination defined in claim 1 wherein said actuating member comprises a bar manipulable by the fingers of a user holding said casing.

5. The combination defined in claim 1 wherein said actuating member comprises a spring-loaded projection engageable by the head of a user holding said casing.

6. The combination defined in claim 5 wherein said projection comprises a mounting for an eyepiece of a viewfinder.

7. The combination defined in claim 1 wherein said camera is equipped with a photometer, further comprising switch means coupled with said support for energizing said photometer upon movement of said support into said alternate position by said actuating member.

8. In a cine camera, in combination:
a casing adapted to accommodate a motion-picture film having a sound track, said casing being provided with an exposure gate and sound-recording means;
drive means in said casing for transporting said film past said exposure gate and said sound-recording means, said drive means including a continuously rotatable capstan and a pinch roller adapted to clamp said film therebetween;
energizing means for said drive means including manually operable trigger means;
relatively displaceable support means for said pinch roller and said capstan; and
an external actuating member on an outer surface of said casing coupled with said support means and manually operable independently of said trigger means for relatively displacing said pinch roller and said capstan from a more widely separated normal position into a relatively closed spaced alternate position preparatorily to operation of said trigger means, said actuating member comprising a spring-loaded mounting for an eyepiece of a viewfinder engageable by the head of a user holding said casing.

9. The combination defined in claim 8 wherein said support means comprises a movable element carrying said pinch roller with limited relative mobility, further comprising control means responsive to operation of said trigger means in said alternate position of said support means for displacing said pinch roller relatively to said element toward said capstan for clamping said film therebetween.

10. In a cine camera, in combination:
a casing adapted to accommodate a motion-picture film having a sound track, said casing being provided with an exposure gate and sound-recording means;
drive means in said casing for transporting said film past said exposure gate and said sound-recording means, said drive means including a continuously rotatable capstan and a pinch roller adapted to clamp said film therebetween;
energizing means for said drive means including manually operable trigger means;
relatively displaceable support means for said pinch roller and said capstan; and
an external actuating member on an outer surface of said casing coupled with said support means and manually operable independently of said trigger means for relatively displacing said pinch roller and said capstan from a more widely separated normal position preparatorily to operation of said trigger means, said suport means and said trigger means being provided with coacting formations preventing the operation of said trigger means in said normal position.

11. The combination defined in claim 10 wherein said support means includes a movable element connected with said pinch roller and positioned for coacting with said trigger means to move said pinch roller from said alternative position into a film-clamping position still closer to said capstan.

12. In a sound-film camera, in combination:
a casing adapted to accommodate a motion-picture film having a sound track, said casing being provided with an exposure gate and sound-recording means;
drive means in said casing for transporting said film past said exposure gate and said sound-recording means, said drive means including a continuously rotatable capstan and a pinch roller adapted to clamp said film therebetween;
energizing means for said drive means including manually operable trigger means;
relatively displaceable support means for said pinch roller and said capstan;
an external actuating member on an outer surface of said casing coupled with said support means and manually operable independently of said trigger means for relatively displacing said pinch roller and said capstan from a more widely separated normal position into a relatively closely spaced alternate position preparatorily to operation of said trigger means; and
an energizing circuit for a component intervening in the taking of motion pictures, said circuit including switch means coacting with said support means for preventing the energization of said components in said normal position.

13. The combination defined in claim 12 wherein said component is a photometer.

* * * * *